United States Patent [19]

Lanzer et al.

[11] Patent Number: 4,842,111
[45] Date of Patent: Jun. 27, 1989

[54] DRIVE SYSTEM FOR MOTOR VEHICLES HAVING DRIVEN FRONT AND REAR AXLES

[75] Inventors: Heribert Lanzer, Gossendorf; Peter Resele, Graz, both of Austria

[73] Assignee: Steyr-Daimler-Puch Aktiengesellschaft, Vienna, Austria

[21] Appl. No.: 192,323

[22] Filed: Apr. 27, 1988

[30] Foreign Application Priority Data

Apr. 28, 1987 [AT] Austria ................................. 1050/87

[51] Int. Cl.⁴ ....................... F16D 13/04; F16H 37/00
[52] U.S. Cl. ........................................ 192/35; 74/411; 192/31; 192/58 C
[58] Field of Search ..................... 192/35, 31, 32, 34, 192/30, 58 C, 57; 74/711, 710, 713, 714

[56] References Cited

U.S. PATENT DOCUMENTS

| | | | |
|---|---|---|---|
| 3,433,319 | 3/1969 | McLean | 192/32 X |
| 4,031,780 | 6/1977 | Dolan et al. | 192/35 |
| 4,076,108 | 2/1978 | Fogelberg | 192/35 |
| 4,672,861 | 6/1987 | Lanzer | 74/655.6 E |
| 4,696,164 | 9/1987 | Giere | 192/35 |
| 4,729,262 | 3/1988 | Lanzer | 192/58 C |
| 4,765,434 | 8/1988 | Kawamoto et al. | 74/411 |

*Primary Examiner*—James T. McCall
*Attorney, Agent, or Firm*—Marmorek, Guttman & Rubenstein

[57] ABSTRACT

A drive system for motor vehicles having driven front and rear axles comprises a liquid friction coupling, which is incorporated in the rear axle drive train, and a clutch, particularly an overrunning clutch, which is connected in series with said liquid friction coupling and arranged to be released in response to a front axle speed exceeding the rear axle speed. In order to avoid a requirement for stronger steering forces during a reverse travel and to avoid an operation of the liquid friction coupling with mixed friction, that second clutch is arranged to be automatically engaged in dependence on the liquid temperature in the liquid friction coupling or of other variables.

5 Claims, 1 Drawing Sheet

U.S. Patent          Jun. 27, 1989          4,842,111
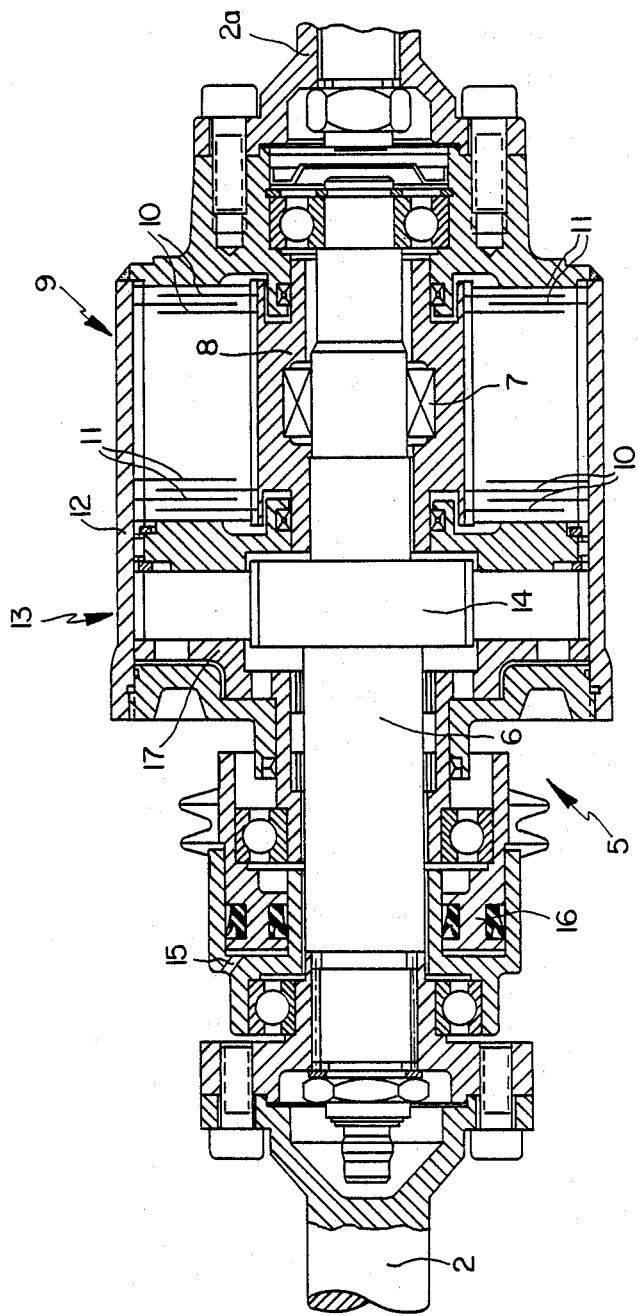
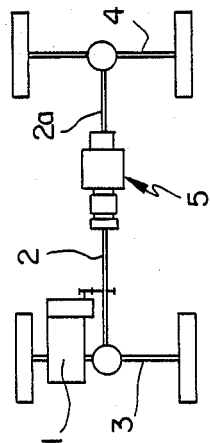

4,842,111

DRIVE SYSTEM FOR MOTOR VEHICLES HAVING DRIVEN FRONT AND REAR AXLES

BACKGROUND OF THE INVENTION

1. Field of the Invention

This invention relates to a drive system for motor vehicles having driven front and rear axles, comprising a liquid friction coupling, which is incorporated in the rear axle drive train, and a clutch, particularly an overrunning clutch, which is connected in series with said liquid friction coupling and arranged to be released in response to a front axle speed exceeding the rear axle speed.

2. Description of the Prior Art

Such a drive system is already known from Published German Application No. 33 17 247. The clutch consisting particularly of an overrunning clutch serves to automatically interrupt the drive train during a braking of the vehicle so that a decrease of the surface speed of the front wheels resulting from the braking will not be transmitted by the drive train to the rear wheels. To ensure a drive of the rear wheels also during a reverse travel, the clutch preferably consisting of an overrunning clutch must be bridged. For that purpose a separate mechanism was previously provided, which was actuated whenever the reverse gear was selected.

It is known that constraining torques between the front and rear axles will occur in vehicles having a liquid friction coupling in the drive train when such vehicles are cornering through very narrow bends and that such constraining torques will have the result that the coasting distance is reduced and that the required steering force may be increased. The requirement for stronger steering forces is particularly inconvenient to the driver when he must corner a narrow bend while reversing, as is often the case. For this reason the known arrangement in which the overrunning clutch is automatically bridged during any reversing, as proposed in Published German Application No. 33 17 247, is not desirable.

It is also known in practice to provide liquid friction couplings which are so designed that under certain operating conditions the torque will be transmitted not only by the shearing forces in the viscous liquid but also directly by mixed friction between the disks of the coupling. That mode of operation is required in order to avoid an overtemperature in the coupling. But in order to minimize the wear of the disks under that operating condition, disks having an adequate size must be provided in an adequate number and must have a special shape and surface coating so that their manufacturing costs will be much higher than those of the conventional disks made simply by stamping. Moreover, there will be a higher tire slip of the front wheels of the motor vehicle until the liquid friction coupling assumes the operating condition involving mixed friction and said increased tire slip will adversely affect the cornering stability of the vehicle.

SUMMARY OF THE INVENTION

It is an object of the invention to eliminate the disadvantages outlined hereinbefore and so to improve the drive system described first hereinbefore that the requirements for stronger steering forces during a reverse travel and for a mixed friction in the liquid friction coupling will be eliminated.

That object is accomplished in accordance with the invention in that an additional or second clutch is provided, which is engageable to bridge the liquid friction coupling and the clutch connected in series therewith and is adapted to be actuated under load and to be automatically engageable during forward and reverse travel, e.g., in dependence on the liquid temperature in the liquid friction coupling and/or in dependence on the speed difference between the front and rear axles.

In such a drive system the overrunning or other clutch is not automatically bridged during a reverse travel but during a reverse travel under normal road conditions the vehicle will be driven only by the front axle drive so that increased steering forces will not be required. Only when the front wheels are slipping so that the speed difference across the liquid friction coupling increases will the second clutch be engaged so that the all-wheel drive which will then be required and desirable will be achieved and the coasting distance will not be decreased. Because the second clutch is engaged also in response to an excessive liquid temperature in the liquid friction coupling, the latter need not be designed for an operation with mixed friction so that the structural expenditure involved in the liquid friction coupling will be decreased. The second clutch may be automatically engaged under the control of a temperature sensor provided in the liquid friction coupling or, for a reverse travel, under the combined control of the throttle assuming a predetermined position and of the means for selecting the reverse gear. Another variable usable for the control of the additional clutch may consist of the difference between the input and output speeds of the liquid friction coupling, which speed difference will depend on the steering angle.

BRIEF DESCRIPTION OF THE DRAWING

FIG. 1 is a diagrammatic representation of an entire drive system and

FIG. 2 is a sectional view showing the unit that is constituted by the couplings of the drive train.

DETAILED DESCRIPTION OF THE PREFERRED EMBODIMENT

An illustrative embodiment of the invention will now be explained more in detail with reference to the drawing.

In the system shown in FIG. 1 and engine 1 drive via a drive train 2 the front axle 3 and the rear axle 4. The drive train 2 includes a unit that is generally designated 5 and consists of a liquid friction coupling, an overrunning first clutch and a second clutch, which is adapted to be actuated under load.

During a normal forward travel a hub 8 of a liquid friction coupling 9 and a set of inner disks 10 fixed to said hub are driven from the input shaft 2 via an intermediate shaft 6, which is screw-connected to the input shaft 2, and an engaged first or overrunning clutch 7 consisting, e.g., of a roller ratchet. The outer disks 11 of the liquid friction coupling 9 transmit torque to the drumlike coupling housing 12, which is rigidly connected to the output shaft 2a, which constitutes the second part of the drive train. When the vehicle is braked during forward travel the front axle 3 will be braked more strongly than the rear axle 4 owing to the distribution of braking forces prescribed for the sake of stability so that the front wheels will rotate at a lower speed than the rear wheels. As a result, the overrunning clutch 7 will be released so that the low speed of the front axle will not be transmitted to the rear axle.

If a high torque is exerted on the rear axle, e.g., when the wheels of the front axle 3 are slipping, the speed difference across the liquid friction coupling 9 will be high and the difference between the measured speeds of the input shaft 2 and of the output shaft 2a may be determined and utilized for the control of a second clutch 13, which consists of a multiple disk clutch that is adapted to be actuated under load. The intermediate shaft 6 constitutes also a hub 14 which carries the inner disks of the additional clutch 13, the outer disks of which are rigidly connected to the housing 12 of the liquid friction coupling. The inner and outer disks of the second clutch 13 can be forced against each other by a piston 16, which is operable by means of oil under pressure supplied via a supply line 15. It will be understood that when the second clutch 13 is engaged the torque will be transmitted from the shaft 2 via the intermediate shaft 6, the inner and outer disks of the second clutch 13 and the common housing 12 to the output shaft 2a whereas no torque will be transmitted by the overrunning clutch 7 and the liquid friction coupling 9. During a reverse travel the reversed sense of rotation and the action of the overrunning clutch will prevent a transmission of torque unless oil under pressure is supplied to the piston 16 so that the multiple-disk clutch 13 is engaged. The supply of oil under pressure to the piston 16 is controlled by a pilot piston that is not shown and which is responsive to various variables, such as the temperature in the liquid friction coupling. The piston 16, oil supply line 15, pilot piston, and sensor for detecting various variables all constitute an automatic engagement means.

We claim:

1. A drive system for motor vehicles having driven front and rear axles, which drive system comprises
    a rear axle drive train including a liquid friction coupling and a first clutch, which is connected in series with said liquid friction coupling and is arranged to be released in response to a rear axle speed exceeding the front axle speed,
    a second clutch, which is engageable to bridge said liquid friction coupling and said first clutch, and
    clutch-actuating means for engaging said second clutch with said liquid friction coupling during forward and reverse travel in dependence on at least one operating parameter of the vehicle.

2. The drive means set forth in claim 1 as applied to a drive system in which said first clutch is an overrunning clutch.

3. The drive means set forth in claim 1, wherein said clutch-actuating means are arranged to engage said second clutch when the liquid temperature in said liquid friction coupling exceeds a predetermined value.

4. The drive means set forth in claim 1, wherein said clutch-actuating means are arranged to engage said second clutch when the difference between the input and output speeds of said liquid friction coupling exceeds a predetermined value.

5. A drive means set forth in claim 1, wherein said clutch-actuating means are arranged to engage said second clutch when the liquid temperature in said liquid friction coupling exceeds a predetermined value and when the difference between the input and output speeds of said liquid friction coupling exceeds a predetermined value.

* * * * *